Figure 3:
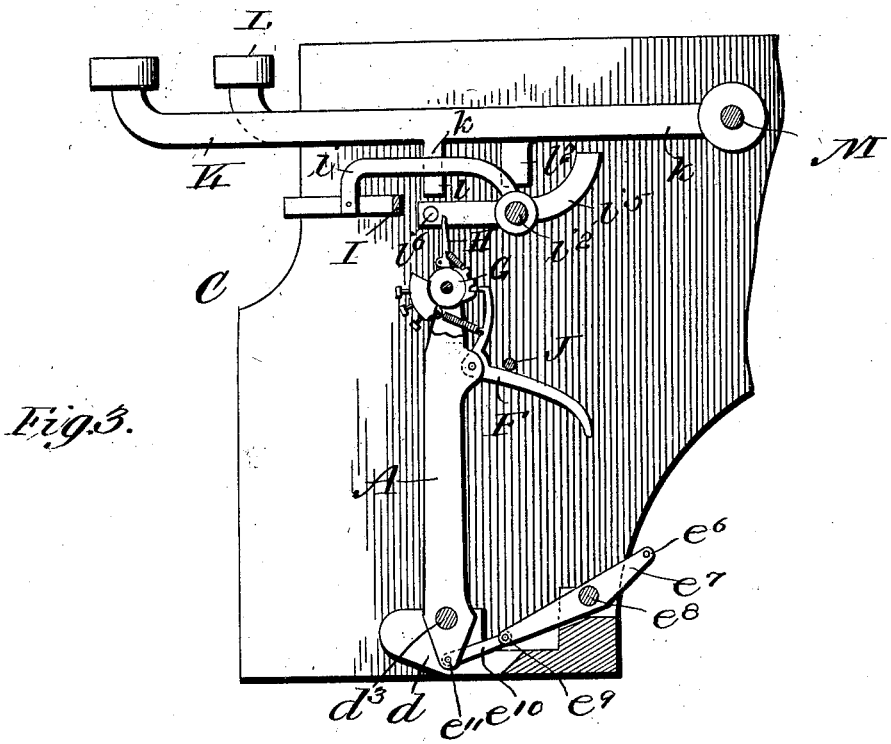

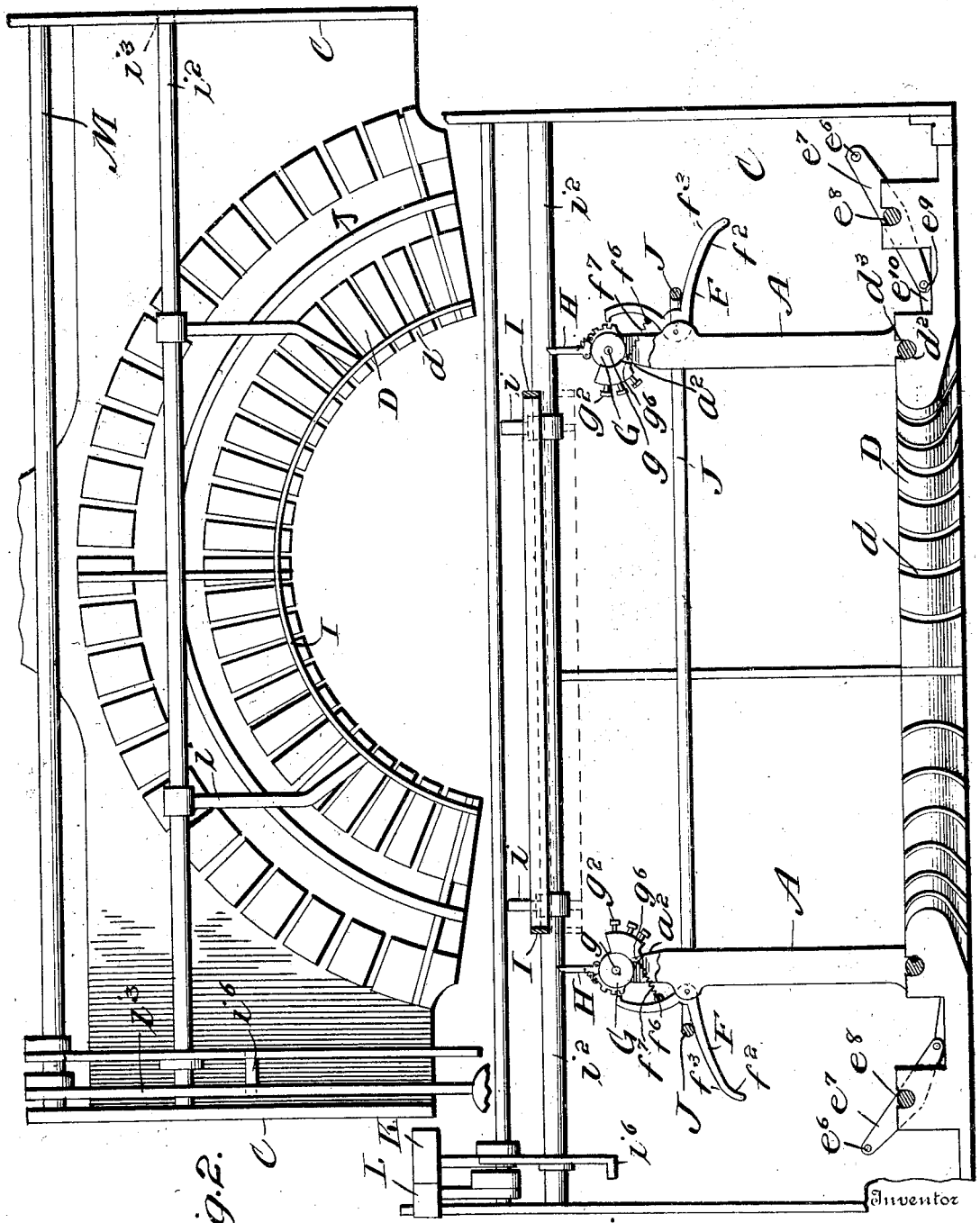

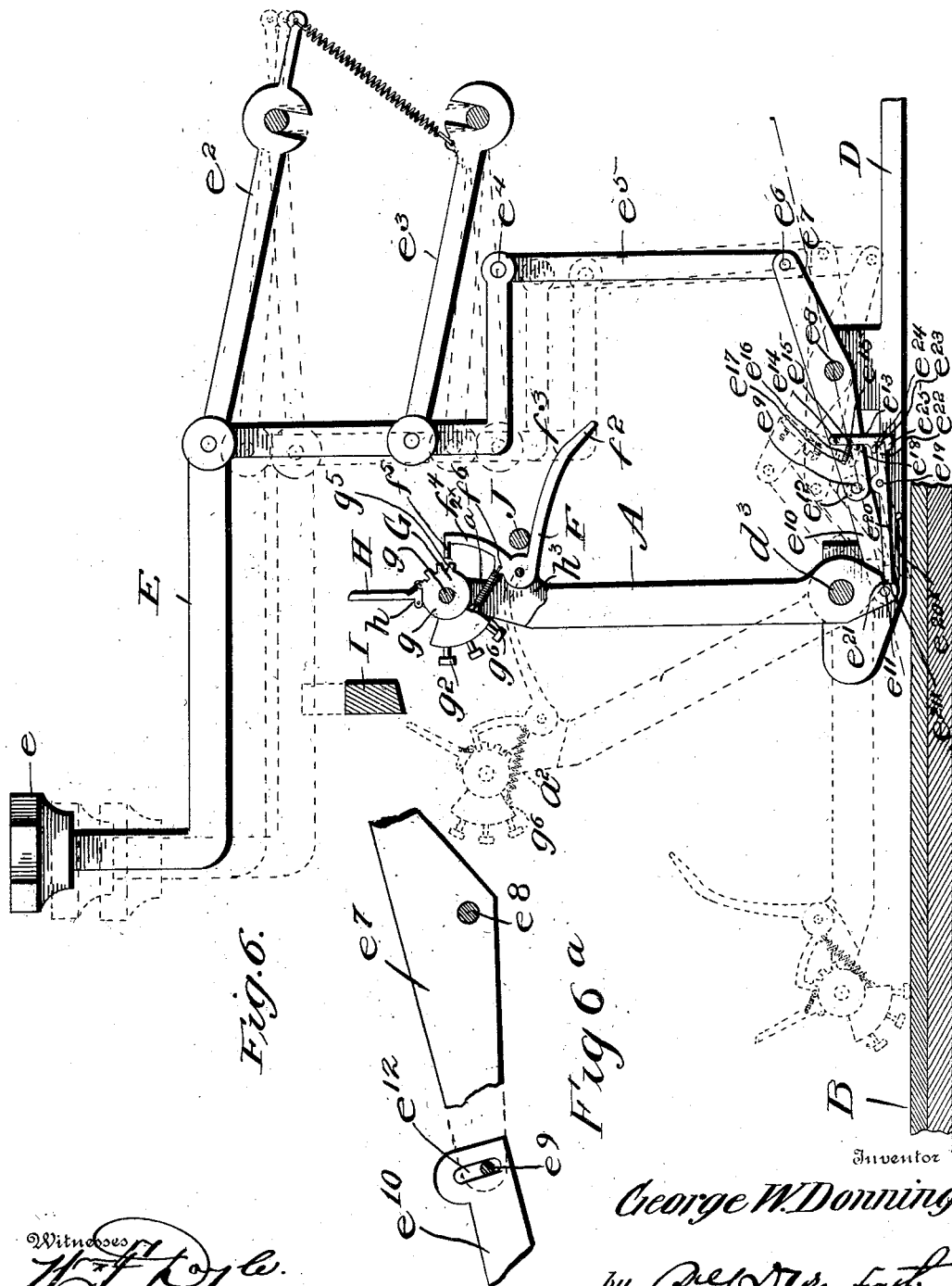

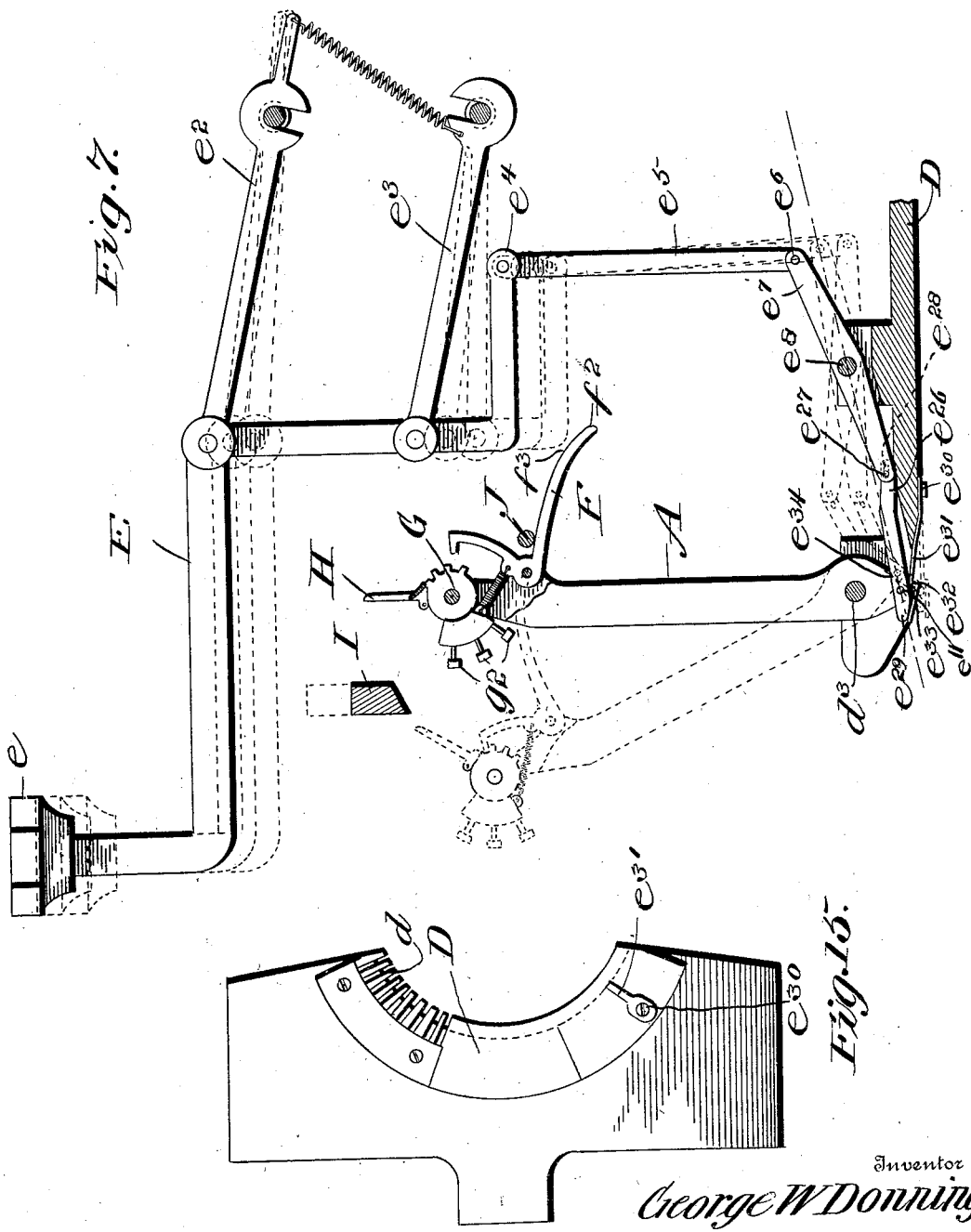

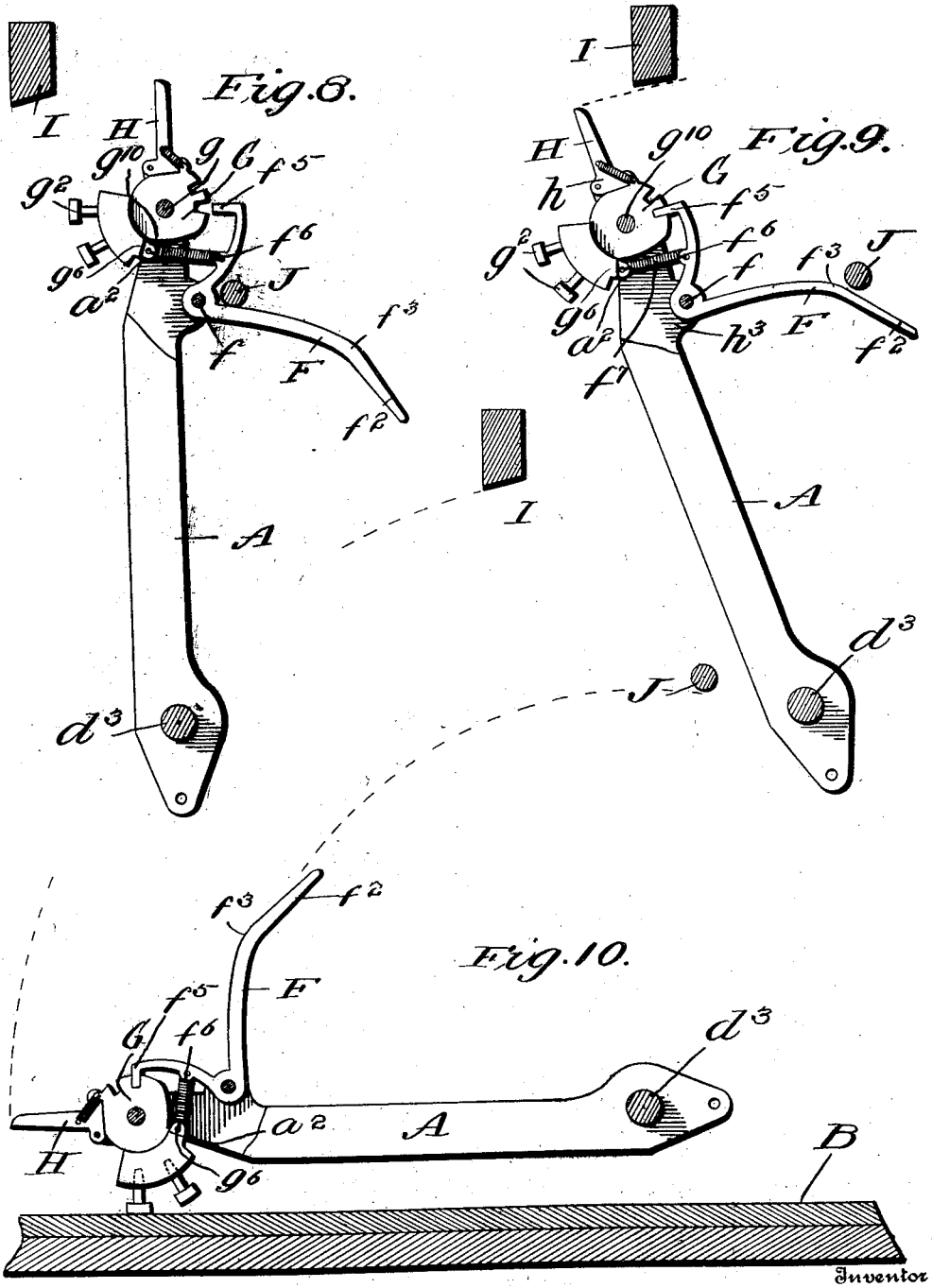

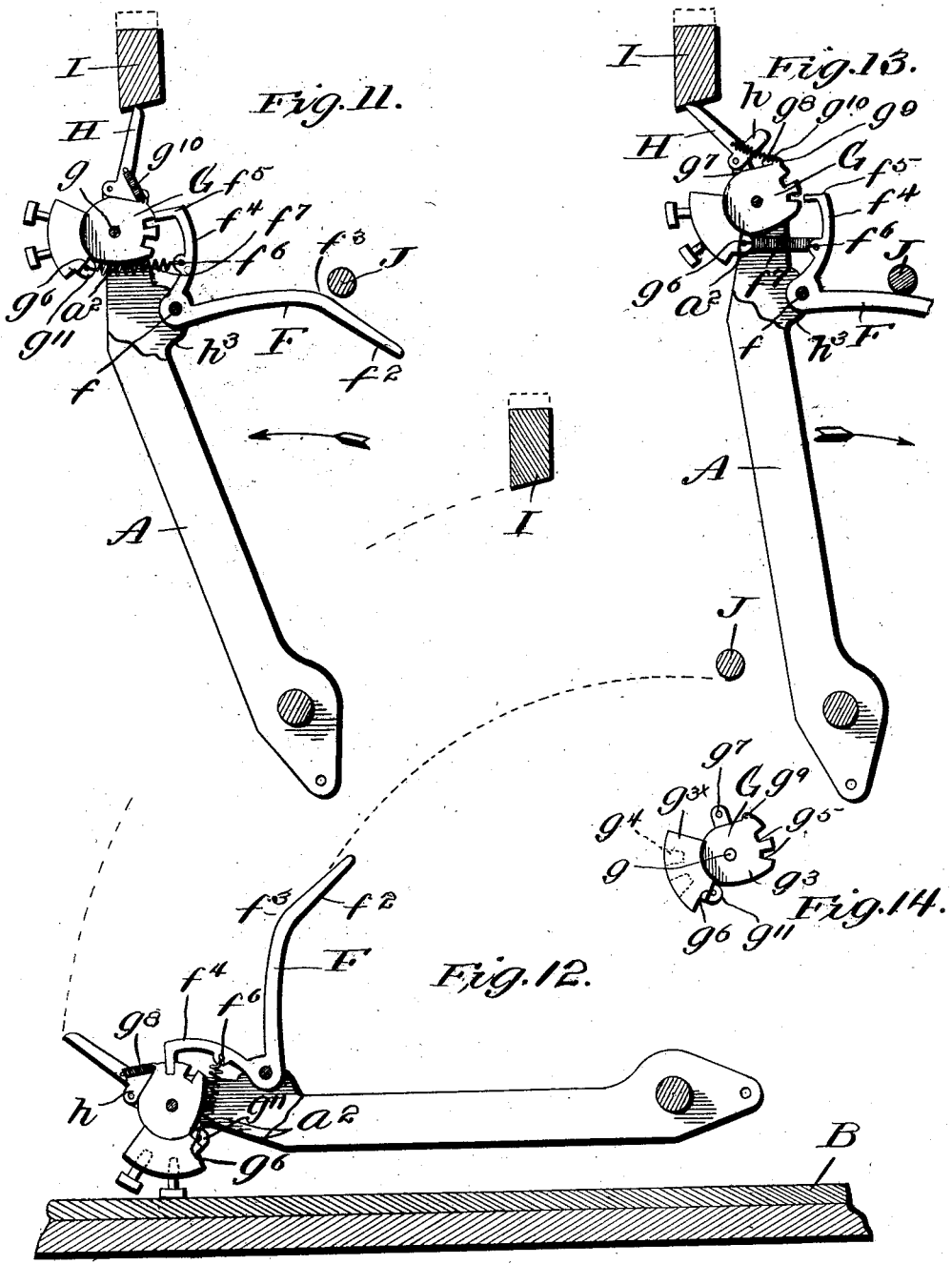

No. 879,815. PATENTED FEB. 18, 1908.
G. W. DONNING.
TYPE WRITER.
APPLICATION FILED AUG. 13, 1904.
7 SHEETS—SHEET 7.
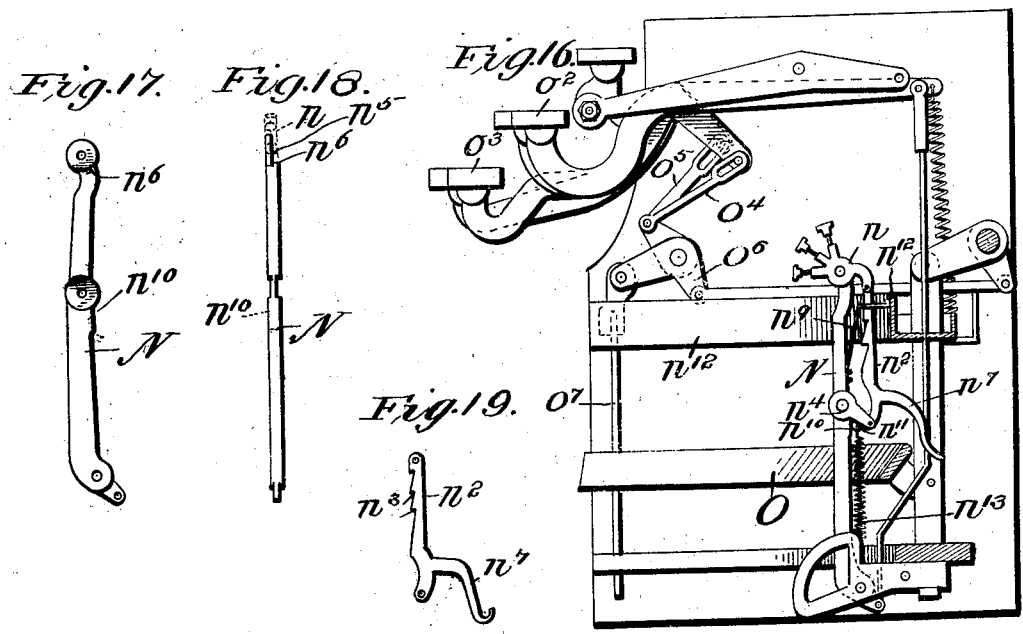
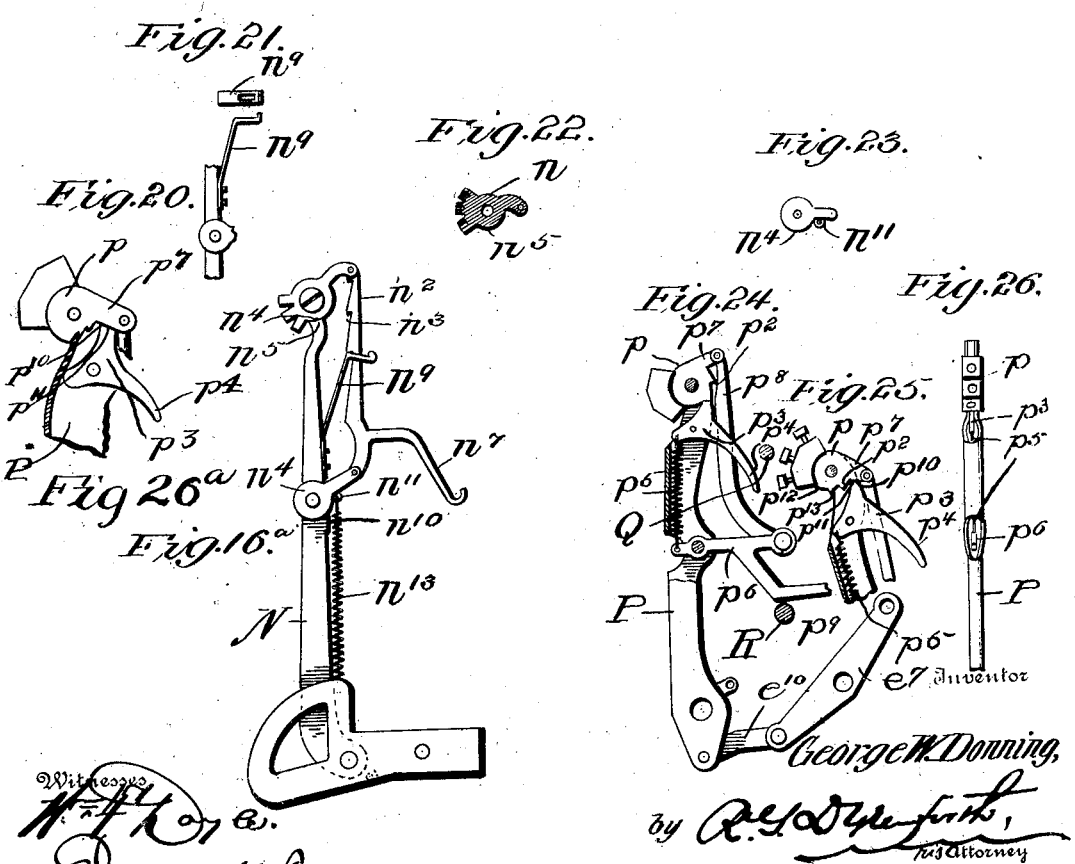

UNITED STATES PATENT OFFICE.

GEORGE WASHINGTON DONNING, OF STAMFORD, CONNECTICUT, ASSIGNOR TO HARRY T. AMBROSE, OF ORANGE, NEW JERSEY.

TYPE-WRITER.

No. 879,815.     Specification of Letters Patent.     Patented Feb. 18, 1908.

Application filed August 13, 1904. Serial No. 220,652.

*To all whom it may concern:*

Be it known that I, GEORGE WASHINGTON DONNING, a citizen of the United States, residing at Stamford, in the county of Fairfield and State of Connecticut, have invented certain new and useful Improvements in Type-Writers; and I do hereby declare the following to be a full, clear, and exact description of the invention, such as will enable others skilled in the art to which it appertains to make and use the same.

My invention relates to typewriters and, more particularly, to a typebar and its actuating mechanism.

In the typebar characterized by my invention, the type-head carries two, three, or more, type-characters, and is movable to position one or another of said characters for printing by the same when the typebar shall have been actuated to the printing point.

The object is, in a simple and efficient manner, to present a typebar wherein the movable multiple type-head, which it carries, shall be capable of being shifted to any of a plurality of printing positions, and be positively locked against movement, either in the direction of descent of the typebar, or in the direction opposite to descent thereof, which said locking shall be effected in any of the printing positions to which said head shall be positioned, that is, in its normal position, as well, in any shifted position or positions, constituting a "double locking" device.

A further object is to present, in connection therewith, mechanism whereby the positioning of said head shall be effected in a certain and expeditious manner to position a desired type-character for printing.

A further object is to present, also, for coöperation therewith, mechanism whereby the locking of the head, in each and any of its plurality of possible positions, against movement in either direction, shall be accomplished with certainty and positiveness.

A further object is to produce, for coöperation therewith, mechanism whereby the unlocking of the head, after having been locked, shall be effected, to permit positioning thereof for a different type-character, which said unlocking device may, also, be employed to hold the locking-device out of engagement with the type-head, until said head shall have been positioned, for one or another of its characters, and then permit the locking-device to engage with and lock the head.

A further object is to present means whereby the type-head will be maintained, normally, in an unlocked and free position and capable of becoming locked immediately upon the bar being moved toward the printing point or the head be repositioned, for a different character.

A further object is to present mechanism for actuating the typebar toward the printing point, for returning the same to normal position, and for locking the same, in such normal position, against rebound.

A further object is to present means whereby the typebar can return to its normal position, even though the head-shifting member has been inadvertently or otherwise positioned in the path of a returning bar, the head of which had not been actuated, or had been actuated to a degree less than the head-shifting member's new position.

A further object is to provide means for locking the typebar in normal position and against rebound.

A further object is to provide means for locking the typebar and for unlocking the type-carrying head and means for returning the head to normal position after having been shifted.

The invention has for its object other equally important and salient and novel features which will hereinafter more fully appear.

The invention resides in various novel constructions and combination and arrangement of parts, as hereinafter more fully disclosed and claimed.

In the accompanying drawings, forming a part of the present specification, and in which like letters of reference indicate corresponding parts, I have illustrated three of the embodiments of my invention, it being obvious that the same is capable of varied embodiment, like the forms herein shown, or in other forms and modifications— all being within the spirit of my said invention.

Figure 4:
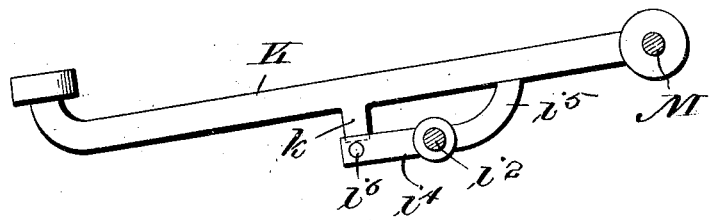
Figure 5:
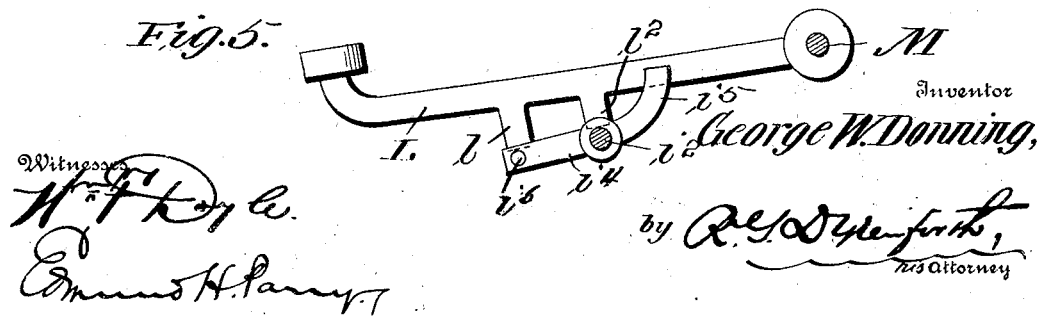

In these drawings: Figure 1 is a view in front elevation, illustrative, among other things, of a typebar, its actuating and "double" locking devices, and the mechanisms for shifting and unlocking the head,— all disposed in the movable carriage of a downwardly-acting writing mechanism of a flat platen typewriter; Fig. 2 is a view in plan thereof; Fig. 3 is a view in side elevation of a typebar and the head-shifting and positioning mechanisms; Figs. 4 and 5 are detached views in detail of the "capital" and "figure"-operating or shift keys of the head-shifting mechanism; Fig. 6 is a detached view, enlarged, in side elevation, of a three-character typebar, and showing, more particularly, in full lines, the normal position of the bar and its movable head; and, in dotted lines, the bar at one point in its descent, and at the printing point, the head appearing as shifted to its third printing position; the typebar-actuating parts also being shown, in dotted lines, in their shifted positions; Fig. 6ª is an enlarged fragmentary view of the typebar connecting link and sub-lever; Fig. 7 is a similar view of a modification, and showing, also, in dotted lines, the position of the key-lever and its supporting parallel links and connections; Fig. 8 is a view, in detail, of a modified form of typebar, carrying a movable head provided with two type-characters, instead of three, with the means for positioning the head; Fig. 9 is a similar view, showing the bar at one point in its descent, as indicated by the arrow,—the head remaining in its normal or first position, to present, say, a lower case character; Fig. 10 is a similar view, showing the same bar at the printing point; Fig. 11 is a similar view with the bar in the course of its downward movement and the head, being shifted, during its descent, to position it for its second position for presenting an upper case character; Fig. 12 is a view of the same, at the printing point; Fig. 13 is a view of the bar at one point in the course of its ascent or return to normal position, (as indicated by the arrow) and showing the arrangement for permitting the head to remain unshifted when its tripping or actuating arm contacts with the shift-operating mechanism; Fig. 14 is a view in detail of the type-head; Fig. 15 is a view, in bottom plan, of the base or fulcrum plate, in which the typebars are disposed; Figs. 16 and 16ª are views, in side elevation, of a modified form of typebar, type-head-shifting device and shift-operating mechanism; Fig. 17 is a view, in detail, of the bar,—the head and other parts being omitted, for the sake of clearness; Fig. 18 is a view in front elevation thereof, showing, in dotted lines, the head disposed on the bar; Fig. 19 is a detail view of the combined head-shifting and locking-lever; Fig. 20 is a detail view of a portion of the typebar, and the locking-spring; Fig. 21 is a view in plan of the locking-spring; Fig. 22 is a view in detail of the type-head; Fig. 23 is a view in detail of the rocking link disposed centrally of the bar; and Figs. 24, 25 25ª, and 26 are views, respectively, in side and front elevation, of still another form of typebar.

Referring to the drawings, and to Figs. 1 to 15, A designates a typebar, preferably, downwardly-acting for a flat platen typewriter; though it is to be understood that the same may also be employed in writing in connection with a round-platen and operate upward toward the same, or reciprocate or oscillate horizontally, thereto. The bar is, preferably, formed to give lightness to its structure and, at the same time, strength; and this form also presents a housing in which may, if desired, be arranged any desired operating parts of the device.

The bar is designed to be depressed to the platen B, which, in this instance, is illustrated as being flat, that is, as having a flat writing-surface; and traveling over this platen is a carriage C, preferably of the form illustrated, in Figs. 1–3; and provided at its lower portion with a base or fulcrum plate D, (which may be a single piece of metal, or be of separate units, appropriately arranged collectively) in which are constituted the typebar bearings $d$ formed by cutting out the forward enlarged portion; as shown. By this arrangement a wide bearing is provided whereby the bar is properly guided in its movement to present a proper alinement of writing during operation. In this front portion of the fulcrum plate and in the top thereof, there is formed a groove $d^2$, extending around the plate in a semi-circle, the upper edges of the groove overhanging; and in this groove, a typebar fulcrum-wire $d^3$ is placed, for purposes hereinafter described,—the overhanging portion of the groove therein serving to hold the fulcrum-wire in place, the same designed to be inserted into the slot from one end of said fulcrum plate. The typebar is actuated toward the platen by a combination and arrangement of elements (presently to be described) which subserve various important functions:

A key-lever or member E is provided for each typebar, and on the outer end of each key is a button $e$, as usual. The lever itself is preferably of the form illustrated in Figs. 6 and 7, and is supported, preferably, by the parallel links $e^2$, $e^3$, arranged as shown. Connecting with the key-lever E, at $e^4$, is a link $e^5$, which connects, at $e^6$, with a sub-lever $e^7$ pivoted by a fulcrum-wire $e^8$, on the fulcrum-plate (extending from one side of the fulcrum plate to the other and penetrating the several sub-levers of the different typebars) to the rear of the pivotal point of the typebar itself. Connecting with the sub-lever $e^7$, at $e^9$, is a link $e^{10}$, which connects at its other end, at $e^{11}$, with the lower end of the typebar. The pivotal points $e^8$, $e^9$, and $e^{11}$, that is, the line of centers thereof, are so arranged that upon depressing the key-lever or member E, the early motion of the sub-lever $e^7$ will tend to move the pivot $e^9$ of the link $e^{10}$ in a path perpendicular to the length of said link. This motion will act to swing said link $e^{10}$ about its pivotal connection $e^{11}$ to the typebar, without, at first, materially rocking said typebar, thus moving the link $e^{10}$ and the sub-lever $e^7$ from their intitial, locked position, in which their axis lay substantially in a common straight line. Upon the further depression of the key member E, the sub-lever $e^7$ acts to move the pivot $e^9$ on the link $e^{10}$ in an arc, which more and more approaches a path parallel to the axis of said link $e^{10}$, and thereby causes a progressive acceleration in the motion of the typebar A about its pivot $d^3$,—the fulcrum-wire hereinabove referred to. The link $e^{10}$ and the adjacent pivotal end $e^9$ of the sub-lever $e^7$ thus constitute a toggle joint; and, as shown, the pivot $e^9$ is located slightly above a straight line passing through the center of the pivots $e^8$ and $e^{11}$ of said toggle. Any force applied to the typebar A to rock it from its normal, upright position will be transmitted through the pivot $e^{11}$ to the link $e^{10}$; and, obviously, the effectiveness of that said force, which tends to bend the toggle, varies directly with the perpendicular distance from the pivot $e^9$ to a right line passing through the centers of the pivots $e^8$ and $e^{11}$. In the construction shown, this perpendicular distance is made so small that the force is expended mainly in causing pressure on the pivots $e^6$, $e^8$, $e^9$ and $e^{11}$, and is ineffective to bend the toggle against the friction engendered by such pressure. Of course, by locating all three of these pivotal points, just referred to, in a right line tangent to the path or point $e^6$, any force transmitted from the typebar through the point $e^9$ to the link $e^{10}$ would be entirely expended in causing pressure on said pivot. Or, again, by locating the pivot $e^9$ below the right line passing through the center of the pivots $e^8$ and $e^{11}$, any force transmitted through the pivot $e^{11}$ to the link would tend to maintain the toggle in its locked position. Therefore, the pivots $e^8$, $e^9$ and $e^{11}$ are so arranged that the typebar A is locked against any rebound from its upright position; and can be rocked from said position only by depressing the key member $e$ to break the toggle locking.

No claim is herein made to the locking toggle device connecting with the typebar, nor to the parallel links $e^2$, $e^3$, for maintaining the key members or levers in position, since these features constitute the subject-matter of my pending application, filed October 26, 1903, Serial No. 178,603.

As shown in Fig. 6 and Fig. $6^a$, the typebar connecting-link $e^{10}$ is provided with an elongated slot $e^{12}$, in its end, which, for the purpose, is enlarged somewhat, as shown, and in this slot, the pivotal connection $e^9$ slides. This permits lost motion between said link and the sub-lever, for purposes hereinafter described.

Pivoted on one end of the sub-lever $e^7$, adjacent to the pivotal-point $e^9$, is a depending arm $e^{13}$, pivoted on the sub-lever at $e^{14}$, and carrying a stud or post $e^{15}$ to which is secured one end of a retractile spring $e^{16}$, which has its other end connected to a stud $e^{17}$ disposed on the sub-lever $e^7$. Contiguous to the depending arm $e^{13}$, and disposed on the sub-lever $e^7$ is a stop post $e^{18}$ for limiting the swing of the depending arm $e^{13}$, in one direction,—the retractile spring $e^{16}$ serving yieldingly to limit the swing of said arm $e^{13}$ in the opposite direction and, at the same time, serving to hold the said arm against or close to the stud or stop-post $e^{18}$. Pivoted at $e^{19}$ on the fulcrum or base plate D (Fig. 6), and arranged somewhat below the typebar connecting-link $e^{10}$, is a rocking arm or lever $e^{20}$, having one end $e^{21}$ abutting against a cut-out or offset $e^{21\times}$ in the extreme lower end of the typebar A, contiguous to the pivotal point $e^{11}$. The opposite end $e^{22}$ of said lever $e^{20}$ is beveled and is designed to project into an indentation $e^{23}$ formed in the depending arm $e^{13}$, respectively, by the upper and lower bosses or projections $e^{24}$ and $e^{25}$, the upper boss being somewhat larger than its companion boss $e^{25}$.

To prevent the rocking arm or lever $e^{20}$ from being rocked too far and caused to drop too close to the platen, I arrange a stop $e^{20\times}$ on the fulcrum plate, with which said arm abuts when it is about to be rocked out of engagement with the depending arm $e^{13}$. Upon arriving at this stop $e^{20\times}$, the arm $e^{13}$, by reason of the arc of travel of the end of said arm being increasingly removed from its normal point of contact with the lever $e^{20}$, would automatically disengage itself from the opposite end of said rocking lever $e^{20}$ while being rocked; and, upon its being returned to normal position, the lower boss $e^{25}$ of the arm $e^{13}$ would latch by the beveled end of said lever $e^{20}$, the engagement of the overhanging upper boss $e^{25}$ operating to force said lever back to its normal position to lock the typebar.

It is to be understood that the device just described operates to lock the typebar and, also, unlock the same. The locking is effected when the boss $e^{24}$ is caused to bear upon the projecting end of the lever $e^{20}$, and the unlocking is effected when the projecting end of the lever $e^{20}$ is borne upon by the boss $e^{25}$ in the operation which results from the rocking of the sub-lever $e^7$ for effecting a raising, approximately perpendicular, of the depending arm $e^{13}$, which rocks the lever $e^{20}$ out of engagement with the offset $e^{21\times}$ of the lower end of the typebar. The slot $e^{12}$ in the connecting-link $e^{10}$ is to permit lost motion between said link and the sub-lever until the rocking arm $e^{20}$ is disengaged from the typebar. It will be understood, of course, that any tendency of the typebar A to rebound, after resuming its normal, upright position, is frustrated by the position of the fulcrum-point of $e^{20}$, or by the offset $e^{21\times}$ abutting against the end $e^{21}$ of the rocking lever $e^{20}$, which is prevented from rocking, under these circumstances, by the depending arm $e^{13}$, which embraces the end $e^{22}$ of said lever $e^{20}$ by means of the bosses $e^{24}$, $e^{25}$. It is obvious that the purpose of beveling the end $e^{22}$ of the lever is to facilitate riding thereon of the boss $e^{25}$ when the locking of the parts is being effected.

In Fig. 7, I have shown a somewhat different arrangement of the instrumentalities for effecting a locking of the typebar in its normal, upright position, against rebound. In this instance, the sub-lever $e^7$, and the link $e^5$ connecting therewith are the same as illustrated in Fig. 6; but, the typebar connecting-link $e^{26}$, pivoted to the lower end of the typebar A, and to one end of the sub-lever $e^7$, is somewhat differently formed, and, in this instance, the pivotal-point $e^{27}$ between the connecting-lever $e^{26}$ and the sub-lever $e^7$ is arranged below the line of centers of the pivotal-points $e^8$ and $e^{11}$, instead of above the same, as in Fig. 6. It is to be noted that, in this figure, when the pivotal point $e^{27}$ moves vertically, the pivotal point $e^6$ reaches the line of centers shortly after the bar A has begun its downward course.

The connecting-link $e^{26}$ is provided with a slot $e^{28}$ in which the pivot-pin $e^{27}$ slides. This link is preferably angular in its form, as shown, to secure the proper movement within the circumscribed space, and is pivoted to the bar A at $e^{11}$, the same as in Fig. 6; but has its end projecting beyond the pivotal-point a short distance, which end, $e^{29}$, is, preferably, rounded.

Secured to the lower face of the fulcrum-plate D, preferably at $e^{30}$, is a spring-finger $e^{31}$, preferably provided with an offset $e^{32}$ to present a shoulder $e^{33}$, designed to engage in an angular cut $e^{34}$ formed in the lower end of the bar A. When this typebar A is in its normal, upright position, the shoulder $e^{33}$ engages in the cut $e^{34}$ in the typebar and locks the typebar against rebound, as is obvious,—the tension of this finger being sufficient to hold the shoulder of the offset $e^{32}$ in frictional engagement with the typebar, and the offset $e^{32}$, the plane of the finger $e^{31}$, and its securing point $e^{30}$ are approximately in a straight line, and the pressure is in the direction of this line, so that said bar cannot move forward against the lock thus constituted. When, however, the key-member or lever E is depressed to rock the sub-lever $e^7$, the pivotal end of the link $e^{26}$ is raised vertically, and causes said link to be rocked on its fulcrum, and this impinges its outer end $e^{29}$ against the outer end of the spring-finger $e^{31}$ to force said finger downward, and this pushes the shoulder $e^{33}$, formed by the offset $e^{32}$, out of engagement with the cut $e^{34}$ in the lower end of the type bar, so that the bar A is then free to move down to the printing-point. When it is returning to its normal, upright position, the spring-finger is again caused to engage the lower end of the typebar, and lock the same against rebound.

On the outer end of the bar A is a multiple type-carrying head G, pivoted at $g$ on the typebar, and carrying two type $g^2$, as shown in Figs. 9–14, inclusive, or a greater number, as illustrated in Figs. 1, 3, 6 and 7. The head is preferably formed as shown in Fig. 14 and constituted of a body-portion $g^3$ and a segmental-portion $g^{3\times}$ integral therewith, in which are formed type-sockets $g^4$. In the rear periphery of the body-portion of the head are formed indentations, serrations, or incuts $g^5$ to constitute teeth. The typebar A may be bifurcated at its outer end, or otherwise formed to present a proper bearing for the type-head, and the type-head is provided with abutting faces $g^6$, to bear against the abutting face $a^2$ on the edge of the typebar to limit the axial movement or rotation of the head in one direction, from normal position, though it is obvious that these abutting faces may be omitted, if desired, and limiting-stops or other devices be provided. One of the teeth $g^5$ is arranged to abut against face $a^{2\times}$ on the edge of the bar opposite to the abutting face $a^2$, and these, in abutting, prevent too great axial movement of the head, when shifted.

Pivoted on a boss $g^7$ disposed on the upper portion of the body of the head is a type-head actuator or tripping-arm H, having its lower end formed with an enlargement $h$ to permit of its being pivoted on said boss $g^7$. A flat bearing surface $g^8$ is formed on the body-portion $g^2$ of the type-head, contiguous to the boss $g^7$, and against this bearing face the enlarged end $h$ of the tripping-arm may abut, if desired, to limit its movement in one direction. At or near the upper portion of the periphery of the type-head, and adjacent to the boss $g^7$, is a perforated projection $g^9$, to which is secured one end of a retractile-spring $g^{10}$, which has its other end secured, in any desired manner, on the tripping member H.

Below the type-head, and on enlarged bearing-portion $h^3$ of the typebar is a locking-lever F, pivoted at $f$ on said enlarged bearing-portion $h^3$, and having a rearwardly-extending arm or tail-piece $f^2$, preferably formed with an upper cam-face $f^3$, as shown. The said locking-lever F is further provided with an upwardly-extending member $f^4$, having its end $f^5$ bent, as shown, and in position to engage in the incuts $g^5$, already referred to. To this member $f^4$ is secured, at $f^6$, one end of a retractile-spring $f^7$, the other end of said spring being secured to a perforated boss $g^{11}$ formed on the segmental portion of the typehead, already mentioned. The said spring $f^7$ is designed to hold the type-head in normal position,—that illustrated in full lines in Fig. 7; and, also, when the head shall have been moved out of the normal position (in the manner herein presently to be described) to return the same to normal position, when the head is released for such purpose. It is to be understood that this form of typebar is designed to carry two or three type, and these are arranged in line one with the other, in the segmental portion of the type-head, as shown, and these are positioned, for printing, when the typebar is actuated to the printing-point, by means of the tripping-arm H in engaging the head-shifting member I, more specifically to be described hereafter. Where there are three type employed, it is necessary to have three indentations, or incuts, or teeth, formed in the rear of the head; but, where only two type are arranged on the type-head, it is obvious that only two incuts or teeth are necessary. In other words, the number of incuts or teeth must correspond with the number of type employed.

For convenience, I arrange the small letter, or lower-case character, in the upper portion of the segmental portion of the head; the capital-letter or upper-case character, is preferably arranged below the lower case character; and the third type may carry figures or other characters, of punctuation, etc. To print a lower-case character, i. e., a small letter, it is not necessary to shift the head, but the same remains in normal position throughout the entire downward stroke, shown in full lines in Fig. 7; but the locking-device engages the head herein described. If, however, an upper-case character, or a capital-letter is desired, the type-head must be shifted; and I elect to have this operation occur toward the outset of the downward stroke of the bar, though it is to be understood that the shifting may be effected at any desirable point in the course of the movement of the bar. To shift the head, the head-shifting mechanism is operated (as hereinafter described) to depress a semi-ring or member I into the path of the tripping-arm H a sufficient distance to cause the said tripping-arm H to engage and rotate the head slightly, that is, until the engaging end $f^5$ of the locking-lever F is opposite, say, to the intermediate incut $g^5$. At that point, the locking-lever F performs an operation which now will be described.

To the rear of the typebars, and preferably in line, approximately, with the pivotal-point $f$ of the locking-lever or pawl F is arranged a buffer member or unlocking-ring J, preferably formed as a semi-ring and extending from one side of the carriage to the other, as shown in Fig. 2. This buffer J is disposed sufficiently close to the typebar so that the cam-face $f^3$ of the locking-lever F will contact with the same, when the typebar is in normal position, as shown in full lines in Fig. 7, and will hold the said locking-lever out of engagement with the type-head, as shown, at all times, when the typebar is in its normal, upright position. When the typebar is actuated toward the printing-point, the cam-face $f^3$ will ride along the lower periphery of the said buffer-ring J during the early portion of the movement of said bar, and then be moved out of contact with said buffer-ring J, at which moment, the retractile-spring $f^7$ will draw the upper member of the locking-lever forward and into engagement with one or another of the incuts or teeth $g^5$, according to which has been positioned for such engagement. If a lower-case letter is to be printed, the locking-lever will engage the lower incut or tooth shown in Fig. 7, and by reason of such engagement, and the form of the incut and of the engaging end $f^5$ of the locking-lever, rigidly and firmly and positively lock the head against movement, i. e., against rotation, in either direction. The head will be firmly and positively locked throughout its entire movement down to the printing-point, while printing, and back to a point where the locking-lever F again engages the buffer J when, by reason of the movement of the lever caused by the engagement of the cam-face $f^3$ of said locking-lever with the buffer-ring, the engaging member of said lever is withdrawn from engagement with the head so that the head is, then, entirely unlocked and free to be moved, until again engaged by the locking-lever F.

When the second character, a capital-letter, for instance, is desired to be positioned, and the head has been rotated, as above described, by engagement of the tripping-arm H with the head-shifting member I, the said tripping arm remains in engagement with the said member I until the head has been rotated or shifted again to bring the middle or second incut opposite to the engaging-end $f^5$ of the locking lever F. At that moment, the typebar has so far progressed in downward stroke as to cause disengagement of the cam-face $f^2$ with the buffer-ring J, when, instantly, the said locking-lever engages the second indentation and positively and firmly and rigidly locks the head against rotation, in any direction, during the entire course of the typebar,—from that point down to the printing-point, during the impact of the type with the work-sheet, and during the course of the return of the bar, in the event of an interference of an ascending bar and a descending bar, toward its normal or upright position, and until the tail-piece of the locking-lever F again contacts with the buffer-ring J which effects disengagement of the engaging-end $f^5$ of said locking-lever from the head, which (through the instrumentality of the retractile-spring $f^7$, or any other means which may be appropriate, as by gravity, or otherwise) is caused to return to its normal position, that shown in full lines in Fig. 7.

If it is desired to print with third character, i. e., the lowermost one arranged on the segmental portion of the type-head, the head is actuated and, as before, of course, prior thereto, or simultaneously therewith, the head-shifting member I is operated to bring this member I into the path of the tripping-arm H, which then remains in sliding contact with said member I, during the continuing stroke of the type-bar, sufficiently long to cause the tripping-arm H to rotate the head to bring the uppermost incut or serration $g^5$ of the head into register with the engaging-end $f^5$ of the locking-lever F. At that point, the bar will have progressed sufficiently far in its downward stroke to withdraw the tail-piece $f^2$ of the locking-lever F from engagement with the buffer-ring J so that the locking-lever will instantly engage the type-head, and firmly and positively and rigidly lock said head against rotation in either direction during the entire stroke of the bar, down to and at the printing-point and during the return of the bar to its normal, upright position, where, when the tail-piece of the locking-lever again engages the buffer-ring J, said locking-lever is disengaged from the type-head. In other words, when the bar is in its normal position, the locking-lever is not in engagement with the type-head and this is then unlocked; but, as the bar moves toward the printing-point, the locking-device is operated and the head is locked, positively and rigidly, against rotation to any other printing position, whether it remains in its normal position to print, say, a lower-case character, or has been shifted to print a capital-letter, or a figure-character. The head is designed to be locked at least in one of its operative positions, and in the forms of device illustrated in Figs. 1–15, inclusive, the locking is effected in all of its printing positions; that is, in each of the three operative positions in the device of Figs. 1–7, inclusive, and in each of two positions, in the form of device illustrated in Figs. 8–14, inclusive. In the forms of device illustrated in Figs. 16–25, inclusive, the head is positively locked in one position, though it is obvious that it may be constructed, even in this form of device, to be locked in all of the positions. It is locked against movement (in the device of Figs. 16–25, inclusive), in either direction, in one of its printing positions, and is locked against movement, in the other of its positions.

The mechanism constituting the head-shifting means will now be described: Arranged somewhat above and to the front of the typebar and extending, in a semi-circle, from one side of the carriage to the other so as to be in front of all of the typebars, is a round or otherwise shaped disk or semi-ring or head-shifting member I suspended from links $i$ keyed on a transverse rock-shaft $i^2$ which is arranged in bearings $i^3$ in the side-plates $c$ of the carriage C. On the rock-shaft, and preferably toward the left-hand edge thereof is a rocking-arm $i^4$, one member $i^5$ of which curves upwardly, as shown in Figs. 3, 4 and 5, while the other member thereof is provided with a stud $i^6$. To rock the shaft $i^2$, I employ a capital-shift-lever K and a figure-shift-lever L, and these are preferably arranged toward the left side of the carriage C, in proximity to the rocking-arm $i^4$, and are fulcrumed on the transverse shaft M arranged toward the rear of the carriage. These levers K and L are preferably arranged in the bank of the other keys for operating the typebars. The capital-shift-lever K is made somewhat longer than lever L, for convenience, and has a depending lug $k$ designed to impinge against the stud $i^6$ on the rocking-arm $i^4$ to depress one end of said arm and thereby rock the shaft $i^2$, as shown in Fig. 4. It is to be understood that when the rock-shaft $i^2$ is rocked by the capital-shift-lever K, the links $i$ secured to the rock-shaft $i^2$ will be lowered and depress the head-shifting-member I to a predetermined point, i. e., into the path of the tripping member H; and it remains in the path of the tripping member H sufficiently long to insure the rotation of the type-head G to position it so that the second or intermediate indentation $g^5$ (or the third indentation, as the case may be), in said head will be opposite the engaging-end $f^5$ of the locking-lever F, so that, when said locking-lever is released, in the manner already described, it will engage the head and lock the same in position to print a capital-letter. The figure-shift-lever L is also provided with a depending projection $l$ of length somewhat greater than the projection $k$ on the capital-shift-lever K, and it is constructed in this manner so that, when it impinges against the stud $i$ on the rocking-arm $i^4$, it will cause a greater arc of movement of said rocking-arm and, thus, effect a greater rocking of the rock-shaft $i^2$ to secure a larger movement of the links $i$ and, thus, a deeper depression of the head-shifting-member I, so that it will effect a greater shifting of the tripping-member H, into the path of which it, said head-shifting-member I, has been depressed, and this will effect a greater rotation of the movable head on the typebar to position the same to have its third indentation $g^5$ engaged by the locking-lever F, in the manner already described.

It will be observed that the figure-shift-key is provided with another depending projection $l^2$, intermediate of the fulcrum shaft M and the stud $l$ and directly above the rock-shaft $i^2$. This depending projection $l^2$ impinges against the rock-shaft $i^2$ when the projection $l$ impinges against the stud $i^6$ and thereby limits the depression of the key-lever L to prevent too great movement of the rocking-arm $i^4$ and the parts connecting therewith.

The capital-shift-lever is preferably not provided with such an additional depending projection, but has its movement limited by impinging against the upturned end of the member $i^5$ of the rocking-shaft $i^4$, as shown in Fig. 4.

Normally, the levers are in the position illustrated in Fig. 3; but, when the capital-shift-lever is depressed, the figure-shift-key will remain in normal position, while the capital-shift-lever K is made to assume the position illustrated in Fig. 4. If the figure-shift-lever be depressed, the lever K will remain in normal position while the figure-shift-lever L will assume the position illustrated in Fig. 5.

It is to be understood that, if only two type are arranged on the type-head, the figure-shift-key may be dispensed with, since only one positioning of the head-shifting-member I is then necessary. If, however, more than three type are disposed on the type-head, additional shift-levers, arranged and constructed similarly to the levers K and L may be employed, the same being suitably constructed to effect the desired extent of rocking of the arm $i^4$ to secure the necessary movement of the rock-shaft $i^2$, and, thus, the required depression of the head-shifting-member I. It is understood that the rock-shaft $i^2$ may be arranged with any appropriate means for returning it to normal position whenever it has been rocked, as by a spring or springs.

While I have disclosed one specific form of mechanism for shifting the head, as desired, I do not wish to be limited to the peculiar form shown; as it is obvious that I may employ other forms without departing from the spirit of my invention. See Fig. 16.

In the event that, during the return of the typebar from its printing position to its normal, upright position, the head-shifting-device I shall inadvertently have been depressed into the path of the tripper H or shall not have returned to its normal position to permit the tripping member H to pass said member without contact, I have arranged the said tripping member H so that it will latch by this head-shifting-member I in the manner shown in Fig. 13 and, for this purpose, the said tripper is pivoted on the boss $q^7$ so that the tripper can, upon striking the member I, be tilted on its pivot and permit the bar to return to its full, normal position. The retractile-spring $q^{10}$ serves to return the tripping-member to its normal position after "latching by" the head-shifting-member I. I may, of course, have the tripping-member arranged in any other desirable form, but the spring-actuated form is the one I prefer.

In Figs. 16 to 26, inclusive, I have shown somewhat different forms of typebars, though the same in each instance carries a movable head which is capable of being actuated toward the outset of the downward stroke of the typebar and is capable of being locked, positively, against movement, in either direction, in at least one of its printing positions, and be locked, positively, against movement in one direction, in either of its printing positions.

Referring to Figs. 16–20, inclusive, N designates the typebar proper; $n$ the movable type-head provided with a plurality of type and with which connects a head-tripping or shifting-member $n^2$ (provided with teeth $n^3$, $n^3$, $n^3$), to which is pivoted, at its lower end, a rocking-arm $n^4$ fulcrumed on the typebar, approximately at its middle. The type-head $n$ is provided with an abutting or banking face $n^5$ on its lower periphery, and this is designed to abut against an abutting or banking face $n^6$, formed at the upper end of the typebar; these abutting or banking faces serving to limit axial movement of the head in one direction, when the head is shifted, as shown in Fig. 16$^a$. The shifting-member $n^2$ is preferably provided with a tail-piece $n^7$, which is designed to be engaged by a head-shifting member or segmental plate O, which is raised to a plurality of predetermined heights by means of a plurality of levers $o^2$, $o^3$, with which connect, respectively, links $o^4$, $o^5$ pivoted to a bell-crank lever $o^6$, to which are connected arms $o^7$ carrying at their lower ends the said shifting-member O. The shifting or tripping-member $n^2$ is, as stated, preferably provided, on its inner edge, (that facing the typebar) with teeth or serrations $n^3$, $n^3$, $n^3$, which are designed to be engaged by a spring-finger or locking-device $n^9$ secured on the typebar.

It will be understood that, for a small letter, preferably, the head-shifting member O is not moved into the path of the tail-piece $n^7$. For a capital-letter, however, or a figure-designation, the said shifting-device O is elevated to one of the other of its shiftable positions to bring the same within the path of the said tail-piece, so that, as the typebar moves down to the printing point, said tail-piece will be engaged by, or will engage, the member O, and, in riding over the same, it will, by reason of the cam-face formed on its lower edge, actuate the tripping-member $n^2$ and shift the head so that one or the other of the teeth or serrations $n^3$, $n^3$ will be engaged by the spring-finger $n^9$; and the head will, thereby, be locked against movement in one direction while the typebar is descending to print. When the said locking-device, comprising the spring finger $n^9$ and the shifting-member $n^2$ provided with the locking-face $n^3$ combine with the abutting or banking faces $n^5$, $n^6$ formed on the type-head and typebar, as already described, to prevent movement of the head,—the banking-faces serving to prevent movement of the head in one direction, and engagement of the spring-finger with the locking-tooth $n^3$ on the head-shifting-member $n^2$ serving to hold the head against movement in an opposite direction,—it will be understood that the head is rigidly and firmly locked against movement in either direction; and, though the elements for effecting this locking of the head are somewhat modified from the elements constituting the head-locking-device on the form of typebar illustrated in Figs. 1–15, it is obvious that the same result is effected, namely, a positive and rigid locking of the head against movement, in either direction.

On the edge of the typebar, beneath the rocking-arm $n^4$ is formed an abutting face $n^{10}$ which is positioned to be engaged by the perforated lug $n^{11}$ on said rocking-arm $n^4$, and these two, $n^{10}$ and $n^{11}$, in abutting, prevent axial movement of the head in one direction, by reason of preventing the head-shifting arm $n^2$ from having extended downward movement.

In the form of device illustrated in Figs. 16 et. seq., when the spring-finger $n^9$ abuts against the buffer $n^{12}$, it will effect the unlocking of the head by disengaging the said finger from the teeth, and the retractile-spring $n^{13}$, secured to the lug $n^{11}$ on the rocking-arm $n^4$, and to the lower portion of the typebar, will effect a return of the type head and its operating parts to normal position, and, preferably, hold said spring-finger entirely out of engagement with the said shifting member $n^2$, while the parts are in normal position, thus leaving the head free for rotation until the locking-device becomes again operative.

In Figs. 24, 25, 25$^a$ and 26, I have shown still a further modification of a device, wherein there is a movable head constructed to be positioned toward the outset of its downward stroke and be locked when so positioned. In this form of construction, P designates the typebar proper, provided with a movable head $p$ designed to carry a plurality of type. One portion of the type-head is provided with teeth or serrations $p^2$ designed to be engaged by a locking-pawl $p^3$ pivoted on the typebar, and carrying a tail-piece $p^4$ designed to be engaged by a buffer-ring Q disposed to the rear thereof and to effect disengagement of said locking-pawl from the teeth to permit free rotation of the head, as is obvious. Housed in the typebar, and connecting, at one end, with the said locking-pawl $p^3$ is a retractile-spring $p^5$ which, at its other end, connects with one end of a rocking-arm $p^6$. The spring serves to maintain the locking-pawl in engagement with the head and, also, serves the further function of effecting return of the head to normal position after the same has been shifted, locked, and then unlocked. The pawl is held out of normal engagement, in normal position of the bar, by the said pawl abutting against the buffer Q arranged to the rear thereof, the same as described with reference to the device of Figs. 1 to 15. The head also carries a rearwardly-projecting extension $p^7$, to which is pivoted a link $p^8$, the lower end of which is pivoted to the rocking-arm $p^6$ at its end farthest from the point where it is pivoted on the typebar. Depending from the rocking-arm $p^6$ is a tail-piece $p^9$, preferably in the form shown, and designed to be engaged by the head-shifting member R operated similar to the head-shifting-member O in the form of device illustrated in Fig. 16. The head lower edge of the extension $p^7$ is preferably formed with a banking-face $p^{10}$ designed to abut against a banking-face $p^{11}$ formed on the toe of the locking-pawl $p^3$, which serve to hold the head, in normal position, against movement beyond a predetermined point in one direction. To prevent movement of the head beyond a predetermined point in the opposite direction, when shifted, say, to the third position, I preferably arrange the lower periphery of the head with a banking-face $p^{12}$, which will abut against a similar banking-face $p^{13}$ on the edge of the typebar. In this shifted position, the banking-faces $p^{12}$, $p^{13}$ hold the head against movement in one direction, and the locking-pawl by engaging the teeth holds the head against movement in the opposite direction so that the head is, thus, positively locked against movement in either direction. This is, therefore, a "double" or "two-way" locking-device.

When the tail-piece rides over the shifting-member R, it causes the head, through the interposed rocking-arm $p^6$ and the connecting-link $p^8$ to shift the head to one of a plurality of positions and, as the locking-pawl is then released from engagement with the buffer Q, it engages the teeth or serrations in the head and locks the same against movement. Of course, even where the head is not shifted, the locking-device operates to lock the head when the bar is operated. It is to be understood that the banking-faces $p^{12}$, $p^{13}$, respectively, on the type-head and typebar, and on the locking-pawl and the extension $p^7$, when in engagement with the type-head serve to lock the head firmly and rigidly against movement in one or other direction.

It is apparent, from the foregoing, that my invention is capable of embodiment in many forms where the head may be operated with certainty and accuracy of positioning and, when in a certain printing position, be positively locked against movement in either direction. The actuation is effected by mechanism which is under positive control of the operator and which tends to move the head from beginning to end of its rotation and it is not necessary to depend upon centrifugal force. By the arrangement contemplated, and herein disclosed, the head is locked, that is, held against movement to prevent undesired shifting of the same to position the wrong character. In devices of the character herein disclosed, it is essential that the locking of the head shall be effected and be maintained as long as desired to prevent inaccuracy in typewriting. At times, I may elect to lock the head against movement in one direction and have it retained against movement in the other direction, though be free to be shifted in that direction, when desired. At the same time, I may wish to lock the head in both directions, i. e., to effect not only a locking of the head against movement in one direction, but, at the same time, a positive holding of the head against movement in the opposite direction, i. e., in either direction, in the event that the head strikes another type-bar, or another object. In all three of the forms of devices, herein disclosed, it is possible to lock the head against movement in either direction. In the first form of device, described and illustrated, it is possible to lock the head against movement, in either direction, in any and all of its plurality of operative positions, and in the other forms, locking against movement in one direction, in any and all of the printing-positions is possible, and, further, locking against movement in both directions, in one of the printing-positions is possible. Where the device, in any of its forms, locks against movement in two ways, I may designate it a "two-way" or "double" locking-device.

Herein, by the use of the expression "locked", "locking", and similar designations, it is to be understood that I intend to convey the idea that a properly-constituted and particular instrumentality, such as the locking-lever F, or the locking-pawl, already described, or other equivalent construction, is employed for effecting the positive and rigid holding of the head against movement out of operating position,—that is, to a different printing position; and this idea is to be distinguished from any means which merely, and alone, effects the limiting of extent of axial rotation of the type-head. I am aware that there are constructions wherein banking-faces are arranged on the type-head and the typebar to prevent complete rotation of the head, and wherein there is employed, also, merely a detent-spring or other frictional means for merely detaining the head against unrestricted movement, as by centrifugal force. My invention does not comprehend such a device; but, on the contrary, as stated, includes, among other things, an operative instrumentality which engages, the type-head, itself, or a part connecting therewith, to positively and rigidly hold the head against movement.

In order the more incisively to distinguish the present form of locking from the mere frictional retaining common in the art, I shall define the locking device as having positive abutment engagement with the head, or the head-shifting member. Preferably this rigid abutment engagement will be in the form of an interlocking engagement, as shown in the series of views, Figs. 1–15.

The elements employed to effect the shifting, locking, unlocking, and restoring of the head to normal position may obviously be varied or differently arranged and disposed relatively and yet be comprehended by my invention, which includes, among other things, the provision of means for effecting a positive locking of the head against movement in one or two directions.

Having thus described my invention, what I claim and desire to secure by United States Letters Patent is—

1. A typebar embodying the following elements, namely, a movable plural typehead, a shiftable-device traveling with the typebar for shifting the head from one printing position to a different printing position, and a locking device movable into and out of engagement with one of said two elements, to lock rigidly, and to unlock, respectively, the head in any printing position.

2. A typebar embodying the following elements, namely, a movable plural typehead, a shiftable-device traveling with the typebar for shifting the head from one printing position to a different printing position, and a locking device movable into and out of interlocking engagement with one of said two elements, to lock rigidly, and to unlock, respectively, the head in any printing position.

3. A typebar embodying a movable plural typehead, a shiftable-device traveling with the typebar for shifting the head from one printing position to a different printing position, and means constructed to have a two-way positive abutment engagement with one of the first two elements to effect rigid locking of the head against movement in either direction.

4. A typebar embodying a movable plural typehead, a shiftable-device traveling with the typebar for shifting the head from one printing position to another printing position, and means constructed and disposed to have a two-way positive abutment engagement with one of the first two elements in any printing position to effect rigid locking of the head against movement in either direction.

5. A typebar embodying the following elements, namely, a movable plural typehead shiftable to a plurality of printing positions, means for effecting such shifting, and means shiftable into and out of engagement with the head to lock rigidly, and to unlock, respectively, the head in any of its printing positions.

6. A typebar embodying the following elements, namely, a movable typehead, a shiftable-device traveling with the typebar for shifting the head from normal printing position to a different printing position, and means shiftable, respectively, to have a positive engagement with one of the first two elements to lock the head rigidly against re-shifting, and to be disengaged from said element to permit the head to shift.

7. A typebar embodying the following elements, namely, a movable plural typehead, a shiftable-device traveling with the typebar for shifting the head from one printing position to another printing position, a locking device shiftable, respectively, to have positive abutment engagement with one of the first two elements in any printing position to effect rigid locking of the head, and to be disengaged from said head, and means for enabling the head to be unlocked.

8. A typebar embodying the following elements, namely, a movable plural typehead, a shiftable-device traveling with the typebar for shifting the head from one printing position to another printing position, and a locking device having positive abutment engagement with one of the first two elements in any printing position to effect rigid locking of the head, in combination with means additional to the locking-device for effecting return of the head to normal position.

9. A typebar embodying the following elements, namely, a movable plural typehead, a shiftable-device traveling with the typebar for shifting the head from normal printing position to another printing position, and a locking device having positive abutment engagement with one of the first two elements in any printing position to effect rigid locking of the head, in combination with means for effecting unlocking of the head, and means additional to the head-locking device for effecting return of the head to normal position.

10. A typebar embodying the following elements, namely, a movable plural typehead, a shiftable-device traveling with the typebar for shifting the head from normal printing position to a different printing position, and means shiftable to have positive abutment engagement with one of the first two elements to effect rigid locking of the head, in combination with means constructed to completely actuate said shifting means at the outset of the printing stroke, said shiftable head-locking means also being movable out of engagement with the element aforementioned to permit the head to shift.

11. A typebar embodying the following elements, namely, a movable plural typehead, a shiftable-device traveling with the typebar for shifting said head from one printing position to a different printing position, and means shiftable to have positive abutment engagement with one of the first two elements during the movement of the bar toward and from the printing point to effect rigid locking of the head, and, also, out of such engagement to permit shifting of the head.

12. A typebar having a movable typehead and constructed to be locked in either its normal or shifted positions, and locking-elements independent of the typebar to lock the head in two ways in any of its operative positions.

13. A typebar having a movable typehead and constructed to be locked in either its normal or shifted positions, locking-elements independent of the typebar to lock the head in two ways in any of its operative positions, and means for disengaging the locking elements to permit shifting of the head.

14. A typebar, a movable head thereon constructed to be positioned in any one of a plurality of positions, a locking device constructed to engage the head and lock the same in two ways, means for disengaging the locking device from the head, means for moving the head for engagement by and with the locking-device, and means for returning the head to a different position.

15. A typebar having a movable head constructed to be actuated to normal and shifted positions, means for effecting a positive locking of the head in any of said normal or shifted positions against movement to any other of its movable positions, and means independent of the locking means for positioning the head.

16. A typebar having a movable head constructed to be moved to and away from normal position to a shifted position, means for effecting a positive locking of the head against movement, in either direction, to a different printing position, when in its normal or shifted position, means independent of the locking means for moving the head to a shifted position, and means for returning the head to normal position from a shifted position.

17. A typebar having a movable head, a tripping member carried thereby, a locking element distinct from but pivoted on the typebar and connecting with the type-head and constructed to engage the same, at a predetermined position thereon, to lock said head, positively, at any one of its predetermined points against movement, in either direction, out of such printing position.

18. A typebar, a movable plural typehead thereon, a shiftable device also disposed thereon for shifting the head from one printing position to another printing position, means shiftable to have rigid abutment engagement with one of the last two elements at any printing position to effect rigid locking of the head, and shiftable, also, out of such engagement to permit shifting of the head, means for disengaging the locking-means, and means for effecting return of the head to normal position during such unlocking operation.

19. A typebar having a movable, spring-actuated head, a spring-actuated tripper engaging the head, and a double locking-device constructed to hold the head against movement, in any direction, in any of its operative positions.

20. A typebar having a movable, spring-actuated head, a spring-actuated tripping member carried by the head, a spring-actuated locking-device for holding the head, absolutely, against movement, in any direction, from one printing position to a different printing position.

21. A typebar having a movable head, a locking-device distinct from, and normally out of engagement with, the head and constructed to engage the same at a predetermined point, in its travel, to lock the same, absolutely, against movement, in any direction, from one printing position to another printing position, and means for maintaining the locking-device normally out of engagement with the head.

22. A typebar having a movable head carrying a plurality of type and capable of being positioned in a plurality of positions, a locking-device normally out of engagement with the head and constructed to engage the same at a predetermined point in the travel of said head and lock the same against movement in either direction to a different printing position in one of its plurality of positions.

23. A typebar having a movable head carrying a plurality of type and constructed to assume one of a plurality of positions, a locking-device carried by the typebar independent of the type-head and constructed to engage the type-head in any of its plurality of operative positions and lock the head, absolutely, against movement in any direction to a different printing position, and means, independent of the locking-device, constructed to engage the same and remove it from engagement with the type-head.

24. A typebar having a movable head carrying a plurality of type and constructed to assume one of a plurality of positions, a locking-device carried by the typebar independent of the type-head and constructed to engage the type-head, and lock the head, absolutely, against movement, in any direction, from one printing position to a different printing position, in one of its plurality of operative positions, means independent of the locking-device constructed to engage the same and remove it from engagement with the head, and means cooperating with the locking-device for effecting movement of the head when said locking-device shall have been disengaged from the head.

25. A typebar having a movable head carrying a plurality of type and constructed to assume one of a plurality of operative positions, a locking-device carried by the typebar and constructed to engage the type-head and lock it in one of its plurality of positions against movement in either direction, and means connecting with the type-head and the locking-device for effecting movement of the head when the locking-device disengages from the head.

26. A typebar having a movable head carrying a plurality of type and constructed to assume one of a plurality of operative positions, a locking-device carried by, but distinct from, the typebar and constructed to be completely self-retaining and to engage the type-head and lock it, absolutely, in one of its plurality of positions, against movement, in either direction, to a different printing position, and means connecting the type-head and the locking-device for effecting movement of the head when the locking-device disengages from the head.

27. A typebar having a movable head, a movable tripping member disposed thereon and constructed to shift the head from normal to a shifted position, and a locking-device, independent of the tripping member and normally out of engagement with the type-head and constructed to engage the head at a predetermined point in its travel and to lock the same, absolutely, in any of its plurality of positions, against movement, in either direction, to a different printing position.

28. A typebar having a movable head carrying a plurality of type, a tripping member disposed on the outer periphery of the head and constructed to shift the same to a lockable position and be limited against movement in one direction and be yieldingly movable in the opposite direction.

29. A typebar having a movable head constructed to be positioned in one of a plurality of positions, and a locking device normally out of engagement with the head and adapted to be moved into engagement with the same to lock the head, positively, in any one of its plurality of printing positions, against movement, in either direction, to a different printing position, and provided with a cam-faced tail-piece.

30. A typebar having a movable head constructed to assume any one of a plurality of operative positions, and a locking-device distinct from the typebar and adapted to be moved into engagement with the head to lock it, absolutely, in any one of its plurality of printing positions, against movement, in either direction, to a different printing position, and a buffer-device independent of the locking-device and constructed to engage said locking-device and move and hold it out of engagement with the head.

31. A typebar having a movable head carrying a plurality of type and constructed to assume one of a plurality of operative positions, a buffer-device disposed independent of the typebar, and a locking-device carried on, but distinct from, the typebar and provided with a cam-faced tail-piece and constructed to engage said buffer-device and be held out of engagement with the head during shifting of said head when the same is being positioned into its normal or shifted positions and arranged to permit engagement of said locking-device with the head when said device is disengaged from the buffer-device and hold it against movement, in either direction, to a different printing position.

32. A typebar having a movable head provided with a serrated periphery, and a locking-device pivoted on, but distinct from, the typebar and comprising two members, one member thereof being constructed to engage with the serrated periphery of the head to lock the same, absolutely, against movement, in either direction, to a different printing position, and the other of said members comprising a cam-faced tail-piece.

33. In a typewriter, the combination with a typebar having a movable head carrying a plurality of type, of a tripping-member engaging the head, a head shifting device constructed to be moved into and out of the path of said tripping-member, and a locking-device constructed to engage with the head and lock the same against movement to a different printing position, in either direction, and means for effecting disengagement of the locking-device with the head.

34. In a typewriter, the combination with a typebar having a movable head carrying a plurality of type, of a tripping-member engaging the head, a head shifting device constructed to be moved into and out of the path of said tripping-member, a locking-device constructed to engage with the head and lock the same against movement to a different printing position in either direction, means for effecting disengagement of the locking-device with the head, and means for operating the head-locking-device to permit movement of the typebar.

35. In a typewriter, the combination with a typebar having a movable head, of a movable spring-actuated tripping-member pivoted on the head and constructed to shift the same out of normal position, a head shifting member constructed to be actuated into and out of the path of movement of said tripping-member, said tripping-member being held against movement in one direction for effecting shifting of the head upon contacting with one side of the head-shifting member, and capable of yieldingly operating on its pivot when it engages the head-shifting member on the opposite side thereof, and a locking-device carried by the typebar and constructed to engage the head and lock the same in two ways against movement such locking being absolute against movement of the head, in either direction, from one to another printing position.

36. In a typewriter, the combination with a typebar having a movable head, of a spring-actuated type-head tripping-member movable with the head, a type-head shifting member constructed to be moved into and out of the path of movement of said tripping-member, a locking-device carried by and movable with the typebar and constructed to engage the head toward the outset of the downward stroke of the typebar and lock said head against movement in either direction, and a buffer-ring independent of the head shifting member and constructed to engage the locking-device and hold the same free of the type-head, when the typebar is in its normal position, and operating to permit said locking-device to engage the head toward the outset of the downward stroke of the typebar, whereby the said head shall be positively locked against movement to a different printing position.

37. In a typewriter, the combination with a typebar having a movable head provided with a plurality of engaging points, a locking-device constructed to engage said engaging points to lock the head against movement in either direction at the several printing positions, means for holding the locking-device out of engagement with the type-head, normally, a tripping-member carried by said head, and a head shifting device constructed to be moved into and out of the path of said tripping-member to engage the same for shifting the head to a predetermined point for engagement, by the locking-device, with the head to lock the same in the position to which it has been shifted by said tripper member.

38. In a typewriter, the combination with a typebar having a movable head provided with engaging points, a locking-device carried by the typebar and normally out of engagement with the type-head, and a buffer-device constructed to engage the locking-device and hold the same normally out of engagement with the head, and means for effecting engagement of the locking-device with said head at a predetermined point in the downward travel of the typebar to lock the head, absolutely, against movement, in either direction, from one printing position to a different printing position.

39. In a typewriter, the combination with a typebar having a movable head, a locking-device constructed to engage the head, and means constructed to position the head to a predetermined point, whereupon the locking-device is permitted to engage the head to lock the head, absolutely, against movement, in either direction, from one printing position to a different printing position.

40. In a typewriter, the combination with a typebar having a movable head constructed to occupy one of a plurality of operative positions, a locking-device, and means for permitting engagement of said locking-device with the head to lock the head, absolutely, against movement, in either direction, from one printing position to a different printing position when the typebar has reached a predetermined position in the arc of its movement, and means for holding the head in position until engaged by the locking-device.

41. In a typewriter, the combination with a typebar having a movable head constructed to occupy one of a plurality of operative positions, a locking-device normally out of engagement with the type-head and constructed to be moved into contact with the head and, then, to lock the same, absolutely, against movement, in either direction, from one printing position to another, means for holding the locking-device out of engagement with the type-head, normally, and means for effecting movement of the locking-device into engagement with the type-head after the typebar has begun its downward stroke to lock the head, absolutely, against movement, in either direction, from one printing position to a different printing position.

42. In a typewriter, the combination with a typebar having a movable head and constructed to occupy one of a plurality of operative positions, a locking-device normally out of engagement with the type-head and constructed to be moved into contact with the head and, then, to lock the same, absolutely, against movement, in either direction, from one printing position to another, a tripping-member connected to the head for shifting the head to a different printing position from the normal, and means for holding the locking-device out of engagement with the head until said head has been shifted by the tripping-member.

43. In a typewriter, the combination with a typebar having a movable head provided with a series of indentations and constructed to occupy one of a plurality of printing positions, a locking-device normally out of engagement with said movable head and constructed to be moved into contact with the head and, then, to lock the same, absolutely, against movement, in either direction, from one printing position to another, a tripping-member connected to the head for shifting the head to a different printing position from the normal, and means for holding the locking-device out of engagement with the head until the head has been shifted by the tripping-member to position one of said series of indentations opposite to the locking-device.

44. In a typewriter, the combination with a typebar having a movable head, provided with a series of indentations and constructed to occupy one of a plurality of printing positions, a locking-device normally out of engagement with said movable head and constructed to be moved into contact with the head and, then, to lock the same, absolutely, against movement, in either direction, from one printing position to another, a tripping-member connected to the head for shifting the head to a different printing position from the normal, means for holding the locking-device out of engagement with the head until the same has been shifted by the tripping-member to position one of said series of indentations opposite to the locking-device, and means for effecting engagement of the locking-device with the indentation so positioned.

45. In a typewriter, a typebar having a movable head, carrying a plurality of type, and provided with banking faces to limit movement of the head, and a spring-actuated tripper pivoted on the head and constructed to trip the same.

46. A typebar having a spring-actuated head, and a tripping-member carried by the head and constructed to shift the head and a locking-device therefor.

47. A typebar having a movable head, a spring directly connected therewith for effecting movement of the head, and a movable spring-actuated tripper pivoted on the periphery of the head and constructed to move the same and place the said spring under tension.

48. A typebar having a movable head constructed to occupy one of a plurality of printing positions, a spring-actuated tripping-member carried by the head and capable of being tilted in one direction, and means for preventing tilting of the tripper member in the opposite direction.

49. A typebar having a movable head constructed to occupy one of a plurality of printing positions, a tripping-member carried by the head and capable of being tilted in one direction, means for returning the tripper member to normal position after being tilted, and means carried by the said member for preventing tilting of the tripper member in the opposite direction.

50. In a typewriter, a typebar having a movable head constructed to occupy one of a plurality of printing positions, a tripping-member carried by the head and capable of being tilted in one direction, a spring for returning the tripping-member to normal position after being tilted, and abutting shoulders formed on the type-head and the tripping-member for preventing tilting of the tripping member in an opposite direction.

51. A typebar having a movable head constructed to occupy one of a plurality of printing positions, a latching tripping-member carried by the head, and a spring-actuated locking-pawl disposed on the typebar independent of the tripping-member, and means carried by the locking-pawl for regulating its movement toward and away from the movable head.

52. In a typewriter, the combination with a typebar having a movable head constructed to occupy one of a plurality of printing positions, means carried by the typebar for effecting positive locking of the type-head in one of a plurality of its printing positions, against movement, in any direction, to a different printing position, of means connecting with the typebar for actuating the same to the printing-point, and a locking-device positively engaging the typebar for preventing rebound of the same from normal position.

53. In a typewriter, the combination with a type-bar, of a key-member, a toggle device interposed between the key-member and the typebar, and a locking-device engaging the toggle device and the typebar to prevent rebound of the typebar from normal position.

54. In a typewriter, the combination with a typebar, of a key-member, a toggle device interposed between the key-member and the typebar, a locking-device engaging one of said two last-mentioned elements to prevent rebound of the typebar from normal position, and means for operating said locking-device to permit movement of the bar.

55. In a typewriter, the combination with a typebar, of a key-member, a toggle device interposed between the key-member and the typebar, and a locking-device engaging the toggle device and the typebar and deriving movement from the toggle-device to effect unlocking thereof.

56. In a typewriter, the combination with a typebar, of a key-member, a toggle-device interposed between the key-member and the typebar, a locking-device engaging one of said two last-mentioned elements and deriving movement from the toggle device to effect unlocking thereof, and means for operating said locking-device to permit movement of the typebar.

57. In a typewriter, the combination with a typebar, of a key-member, a toggle device interposed between the key-member and the typebar, a locking-device engaging one of said two last-mentioned elements and deriving movement from the toggle device to effect unlocking thereof, means for operating said locking-device to permit movement of the typebar, and means for operating said toggle device and the locking-device.

58. In a typewriter, the combination with a typebar, of a key-member, a toggle device interposed between the key-member and the typebar, a locking-device engaging one of said two last-mentioned elements and deriving movement from the toggle device to effect unlocking thereof, means for operating said locking-device to permit movement of the typebar, means for operating said toggle device and the locking-device.

59. In a typewriter, the combination with a typebar, of a key-member, a toggle device interposed between the key-member and the typebar, a locking-device engaging one of said two last-mentioned elements to prevent rebound of the typebar from normal position, and means constructed for unlocking said device and allow the typebar to be actuated.

60. In a typewriter, the combination with a typebar, of a key-member, a sub-lever, a link connecting the key-member and the sub-lever, a link connecting the sub-lever and the typebar, a rocking-arm disposed contiguous to the sub-lever, a spring-actuated link constructed to operate the rocking-arm to lock the typebar against rebound, in normal position, and to disengage said arm from the typebar by movement of the sub-lever.

61. In a typewriter, the combination with a typebar, of a key-member, a sub-lever, a link connecting the key-member and the sub-lever, a connecting link between the typebar and the sub-lever slotted at one end, a rocking-arm arranged in proximity to said connecting link and having one of its ends normally in engagement with the typebar, a depending operating-link carried by the sub-lever and engaging the other end of said rocking-lever, whereby, when the typebar is in its normal, upright position, the rocking-arm will effect a locking thereof, and, when movement is given to the sub-lever, the said rocking-arm will be moved out of engagement with the typebar.

62. In a typewriter, the combination with a typebar having a movable head, a tripping-member carried by the movable head, a head shifting member constructed to be moved into the path of the said tripping member, and means for moving said head shifting member to one of a plurality of positions to cause the tripping member to shift the head to one of a plurality of operative positions and an independent head locking-device to engage the head.

63. In a typewriter, the combination with a typebar having a movable head constructed to be shifted from its normal printing position to a different printing position, and a tripping-member carried by the movable head, of a head shifting member constructed to be moved into the path of the tripping-member and occupy one of a plurality of positions with reference to said tripping-member, and a plurality of key-members, each provided with means for effecting movement, independent of the other key-member of the head shifting member to position the same in one of a plurality of paths of movement of said tripping-member and an independent head locking-device to engage the head.

64. In a typewriter, the combination with a typebar having a movable head constructed to be shifted from its normal to a different printing position, and a tripping-member carried by the movable head, of a head shifting member constructed to be moved into the path of the tripping-member and occupy one of a plurality of positions with reference to said tripping-member, a plurality of key-members, means carried by the key-members, independent of each other, for effecting independent movement of the head shifting member to position said member in a path of movement of said tripping member different from that effected by movement of the other key-member, and means for limiting the extent of movement of said head shifting member and an independent head locking-device to engage the head.

65. In a typewriter, the combination with a typebar having a movable head constructed to occupy a plurality of printing positions, a tripping-member pivoted on the periphery of the type-head at its upper portion, a head shifting member with which the tripping-member coöperates to shift the head to a printing position different from that of normal, a rock-shaft, a link connecting said rock-shaft with the head-shifting member, a rocking-arm keyed to said rock-shaft, key-members disposed relative to said rock-shaft, and depending studs carried by the key-members, of different lengths, to effect movement of the rocking-arm for positioning the head-shifting member in the path of the tripping-member.

66. In a typewriter, the combination with a typebar having a movable head constructed to occupy a plurality of printing positions, a tripping-member pivoted on the periphery of the type-head at its upper portion, a head-shifting member with which the tripping-member coöperates to shift the head to a printing position other than that of normal, a rock-shaft, a link connecting said rock-shaft with the head-shifting member, a rocking-arm keyed to the said rock-shaft, key-members disposed relative to said rock-shaft, studs carried by the key-members, independent of each other, and of different lengths, to effect independent movement of the rocking-arm for positioning the head-shifting member in the path of the tripping-member, and means for limiting a movement of each key-member.

In testimony whereof, I affix my signature, in the presence of two subscribing witnesses.

GEORGE WASHINGTON DONNING.

Witnesses:
JAMES S. GROSS,
M. P. CHATTIN.